United States Patent [19]
Furuta et al.

[11] Patent Number: 5,978,930
[45] Date of Patent: Nov. 2, 1999

[54] CLOCK SIGNAL CONTROL SYSTEM FOR STOPPING AND ACTIVATING A CLOCK SIGNAL

[75] Inventors: Koichiro Furuta; Masayuki Mizuno; Junichi Goto, all of Tokyo, Japan

[73] Assignee: NEC Corporation, Japan

[21] Appl. No.: 08/946,123

[22] Filed: Oct. 7, 1997

[30] Foreign Application Priority Data

Oct. 11, 1996 [JP] Japan .................................. 8-289153

[51] Int. Cl.[6] .................................................. G06F 1/10
[52] U.S. Cl. .......................................................... 713/601
[58] Field of Search .................................. 395/555, 560; 713/500, 601

[56] References Cited

U.S. PATENT DOCUMENTS

| | | | |
|---|---|---|---|
| 5,546,568 | 8/1996 | Bland et al. | 395/560 X |
| 5,710,910 | 1/1998 | Kehl et al. | 395/555 X |
| 5,710,911 | 1/1998 | Walsh et al. | 395/560 X |

FOREIGN PATENT DOCUMENTS

2-136966  5/1990  Japan .

*Primary Examiner*—Thomas M. Heckler
*Attorney, Agent, or Firm*—Ostrolenk, Faber, Gerb & Soffen, LLP

[57] ABSTRACT

A clock signal control system of the present invention includes a simple circuit for generating a clock stop signal. With this circuit, the system is small size and easy to design and consumes a minimum of power.

5 Claims, 7 Drawing Sheets

CLOCK SIGNAL CONTROL SYSTEM FOR STOPPING AND ACTIVATING A CLOCK SIGNAL

BACKGROUND OF THE INVENTION

The present invention relates to a clock signal control system.

It is a common practice with a semiconductor integrated circuit (LSI hereinafter) using a clock control system to locate a clock stop signal generating circuit at a single position. The clock stop signal generating circuit generates a clock stop signal for interrupting a clock signal while monitoring the computation information of various element units. Japanese Patent Laid-Open Publication No. 2-136966, for example, discloses a clock stop control system in which a clock stop signal generating circuit (CKSTPC) dealing with all the element units is built in an element unit referred to as a vector command executing section (VU-I).

However, the conventional clock signal control system is disadvantageous in that the clock stop signal generating circuit becomes complicated due to the increasing complication of the LSI. Specifically, the conventional clock signal control system has the following problems left unsolved.

(1) A first problem is that the system needs a number of design steps. Element units included in an LSI are sometimes designed by different designers. In the conventional LSI having the stop signal generating circuit implemented as a single unit, the designer of the stop signal generating circuit must grasp the stop timings of all the element units. Particularly, when the individual element unit ends processing at a timing dependent on data input to the element unit, a long verifying time is necessary for the clock stop signal generating circuit to be designed.

(2) A second problem is that a hierarchical structure is difficult to implement. In the conventional LSI, stop signals are generated by using a signal output from a single stop signal generating circuit implemented as a unit. When the number of element unit layers or the number of element units is increased, it is extremely difficult for the designer of the stop signal generating circuit to grasp the stop timings of all the element units.

(3) A third problem is that the stop signal generating circuit needs a broad area. Because the stop signal generating circuit of the conventional LSI is located outside of the element units, the stop signals cannot be generated by using signals appearing within the element units. As a result, the stop signal generating circuit is scaled up.

(4) A fourth problem is that the stop signal generating circuit with such a broad area consumes much power.

(5) A fifth problem is that the circuit arrangement is complicated. Specifically, in the conventional LSI, an element unit for stopping a clock signal and an element unit for generating a stop signal are separate from each other. Therefore, signals must be connected from the unit for stopping a clock signal to a unit including the stop signal generating circuit.

SUMMARY OF THE INVENTION

It is therefore an object of the present invention to provide a clock signal control system having a clock stop signal generating circuit which is simple enough to miniaturize the system, reduce power consumption, and promote easy design.

In accordance with the present invention, a clock signal control system includes at least one element unit having a computing circuit for generating a stop signal for stopping a clock signal, a first clock control circuit for controlling the stop and activation of the clock signal, and a first clock tree for distributing the clock signal. At least one activate signal generating circuit is assigned to the element unit for generating an activate signal which causes the clock signal to be fed to the element unit. The first clock control circuit causes the clock signal to be continuously fed to the first clock tree from the time when the activate signal output form the activate signal generating circuit is activated to the time when the stop signal output from the computing circuit is activated. A clock signal output from the first clock tree is fed to at least one of the computing circuit and an activate signal generating circuit assigned to another element unit subordinate to the above element unit.

Also, in accordance with the present invention, in an LSI including an element synchronous to a clock signal and whose input condition influences an output condition due to the clock signal, a clock signal control system of the present invention allows the element to be divided into a plurality of computing circuits and prevents the individual computing circuit from affecting the operation of the LSI even when the clock signal is interrupted for a certain period of time. The system has at least one element unit, and at least one activate signal generating circuit assigned to the element unit. The activate signal generating circuit generates an activate signal for causing a clock signal to be fed to the element unit in accordance with the processing schedule of the element unit. The element unit has a clock control circuit, a clock tree for receiving a clock signal from the clock control circuit and distributing the clock signal, and a computing circuit for receiving a clock signal output from the clock tree as a drive clock. The clock control circuit continuously feeds the clock signal to the clock tree from the time when the activate signal output from the activate signal generating circuit is activated to the time when a stop signal output from the computing circuit is activated. The computing circuit generates, in synchronism with the clock signal, the stop signal for interrupting computation and application of the clock signal to the computing circuit. The activate signal meant for the clock control circuit is fed from the outside of the element unit while the application of the clock signal to the clock control circuit is stopped by the stop signal output from the computing circuit.

BRIEF DESCRIPTION OF THE DRAWINGS

The above and other objects, features and advantages of the present invention will become apparent from the following detailed description taken with the accompanying drawings in which.

In the drawings, identical references denote identical structural elements.

DESCRIPTION OF THE PREFERRED EMBODIMENTS

Figure 1:
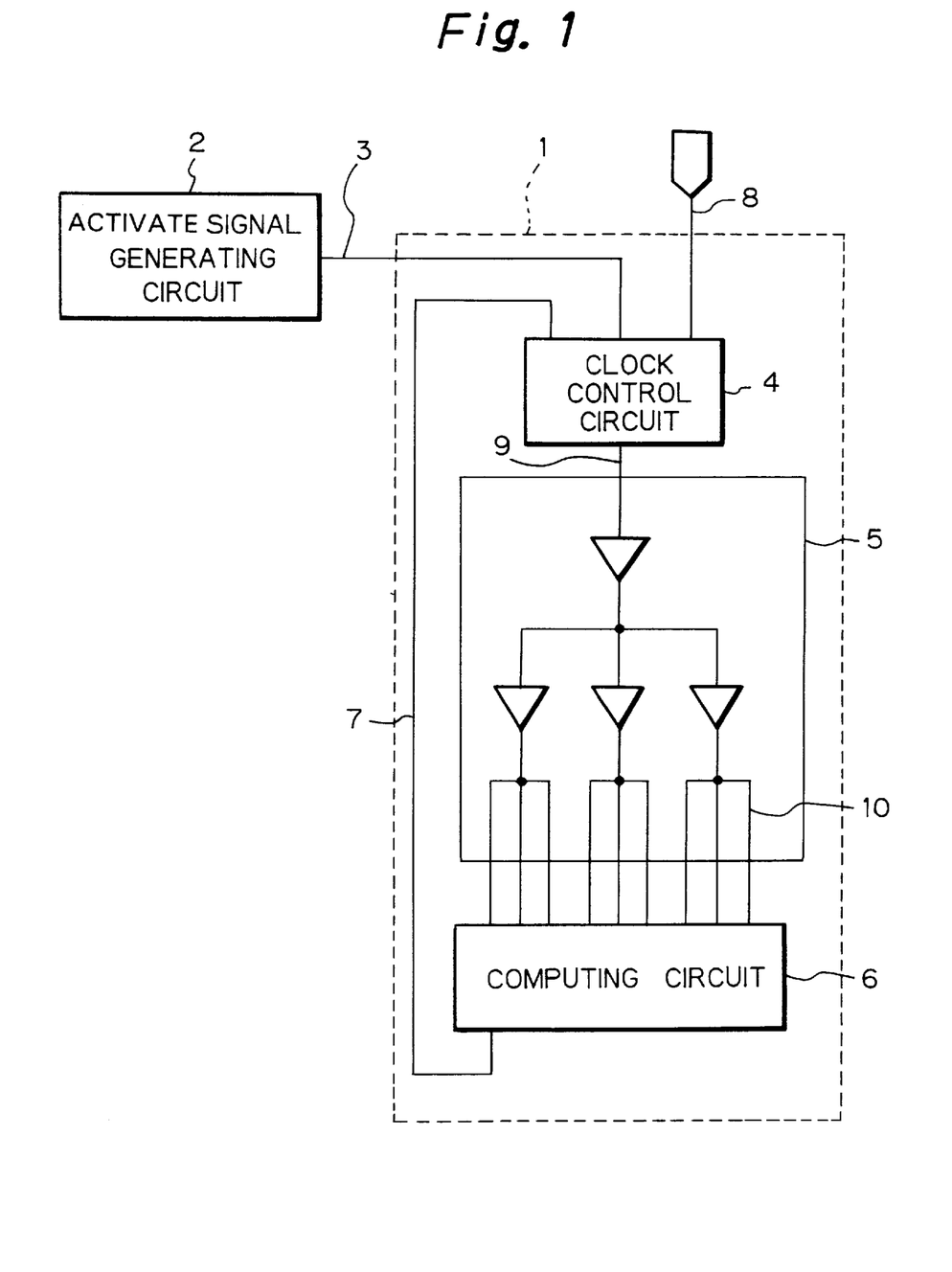
FIG. 1 is a block diagram schematically showing a clock signal control system embodying the present invention.

Referring to FIG. 1 of the drawings, a clock signal control system embodying the present invention is shown. This embodiment is applicable to an LSI operable in synchronism with a clock signal and including an element unit whose clock signal should be interrupted over a preselected period of time. As shown, the system includes an element unit 1 expected to stop a clock signal, and an activate signal generating circuit 2 for activating the clock signal applied to the element unit 1.

The element unit 1 is made up of a clock control circuit 4, a clock tree 5, and a computing circuit 6. The clock control circuit 4 controls the stop and activation of a clock signal 8. A clock signal 9 output from the clock control circuit 4 is distributed by the clock tree 5. Clock signals 10 distributed by the clock tree 5 drive the computing circuit 6. The computing circuit 6 performs computation and outputs a signal 7 for stopping the clock signal (stop signal 7 hereinafter). The stop signal 7 is fed from the computing circuit 6 to the clock control circuit 4. In this manner, while the activate signal generating circuit 2 is arranged outside of the element unit 1, a signal for controlling the stop of the clock signal is generated within the element unit 1. The activate signal generating circuit 2 delivers an activate signal 3 to the clock control circuit 4.

Figure 2:
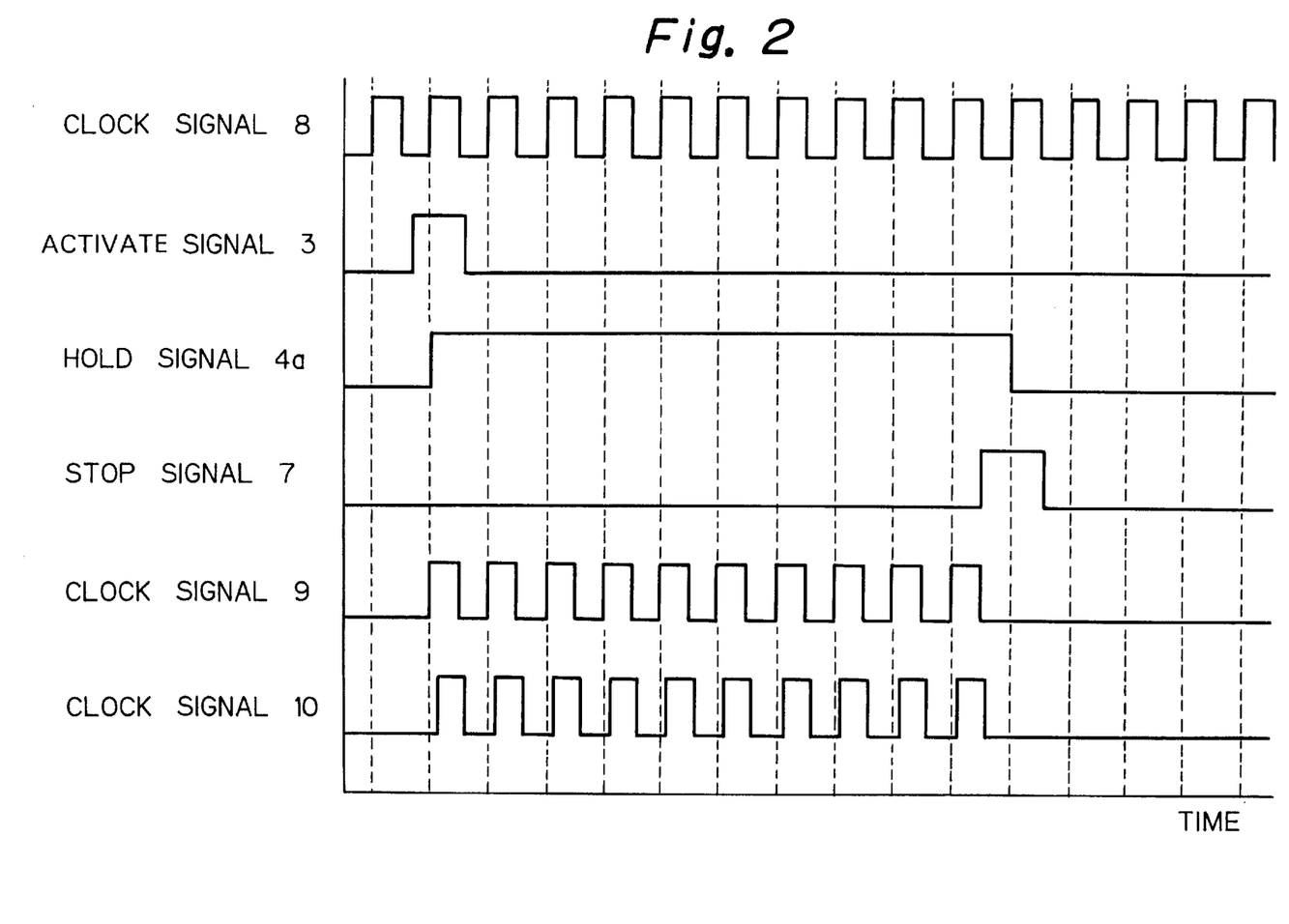
FIG. 2 is a timing chart demonstrating the operation of the system shown in FIG. 1.

The operation of the above system will be described with reference to FIG. 2. As shown, when the computing circuit 6 is driven by the clock signals 10, the upstream clock signal 8 remains active for a longer period of time than the clock signals 10. The activate signal generating circuit 2 generates the activate signal 3 indicative of the start of operation of the computing circuit 6.. In response to the signal 3, the clock control circuit 4 outputs a hold signal 4a for holding the activation information and the clock signal 9 mentioned earlier. When the clock signal 9 is fed to the clock tree 5, the clock tree 5 outputs the clock signals 10 to thereby drive the computing circuit 6. That is, the computing circuit 6 starts operating in response to the clock signals 10. On completing the operation, the computing circuit 6 generates the stop signal 7 showing that the circuit 6 does not need the clock signal 10; in FIG. 2, the stop signal 7 is shown as going high. In response to the stop signal 7, the clock control circuit 4 cancels the hold signal 4a; in FIG. 2, the hold signal 4a is shown as going low. At the same time, the clock control circuit 4 stops outputting the clock signal 9.

Figure 3:
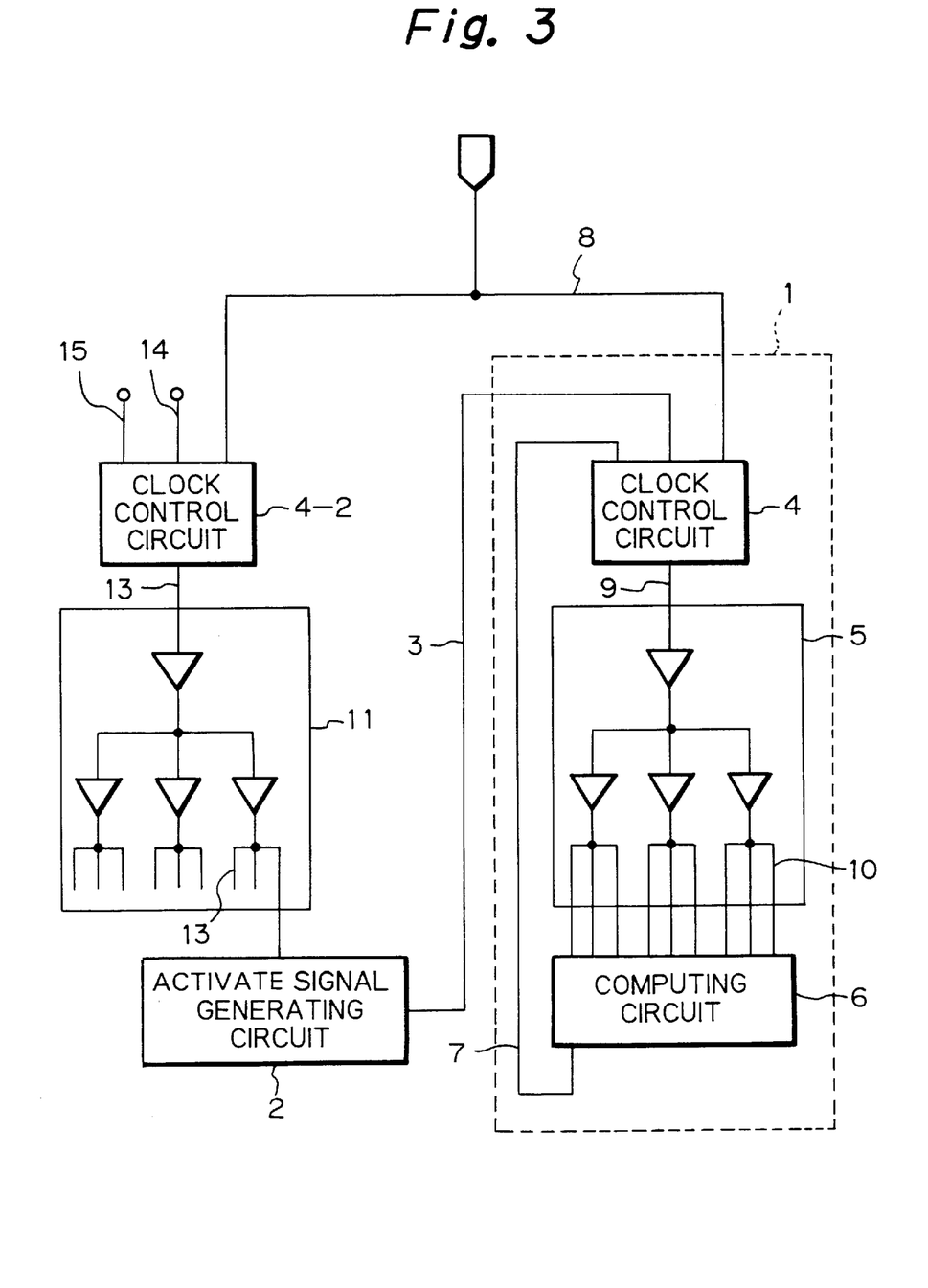
FIG. 3 is a block diagram schematically showing an alternative embodiment of the present invention.

FIG. 3 shows an alternative embodiment of the present invention in which an activate signal is generated within an LSI. As shown, a clock signal control system has a second clock control circuit 4-2 and a second clock tree 11 in addition to the element unit 1 and activate signal generating circuit 2. The activate signal generating circuit 2 outputs the activate signal 3 in accordance with the operation of the computing circuit 6 included in the element unit 1. The activate signal 3 is fed to the first clock control circuit 4 of the element unit 1, as in the previous embodiment. The second clock tree 11 outputs clock signals 13 for driving the activate signal generating circuit 2. The second clock control circuit 4-2 is active at all times and delivers a clock signal 12 to the second clock tree 11. The clock signal 8 is distributed to the two clock control circuits 4 and 4-2 with the same delay time. The first clock tree 5 of the element unit 1 and the second clock tree 11 are so designed as to have the same delay time. Therefore, the computing circuit 6 and activate signal generating circuit 2 start their operations at the same time. This facilitates the design of timings.

In operation, an activate signal 14 fed to the clock control circuit 4-2 remains active at all times, i.e., locked to its active state. Therefore, while the clock signal 8 is active, the clock control circuit 4-2 continuously outputs the clock signal 12. The clock tree 1 receiving the clock signal 12 generates the clock signals 13 for driving the activate signal generating circuit 22. The activate signal generating circuit 2 generates the activate signal 3 in conformity to the processing of the computing circuit 6. The clock signal 8 applied to the two clock control circuits 4 and 4-2 remain active for a longer period of time than the processing of the element unit 1 and that of the activate signal generating circuit 2.

If the clock signal 8 remains active at all times, then the clock signals 13 output from the clock tree 11 also remain active at all times and cause the activate signal generating circuit 2 to operate continuously. The active signal generating circuit 2 outputs the activate signal 3 at the time when the computing circuit 6 is expected to start operating.

The clock signals 13 output from the clock tree 11 have a delay time represented by <clock signal 8>+<second clock control circuit 4-2>+<clock tree>. The clock signals 10 applied to the computing circuit 6 have a delay time represented by <clock signal 8>+<clock control circuit 4>+<clock tree 5>. It follows that if the clock trees 11 and 5 have the same delay time, the clock signals 13 and 10 can rise and fall at the same time as each other. This embodiment therefore facilitates the timing design of the entire LSI.

Figure 4:
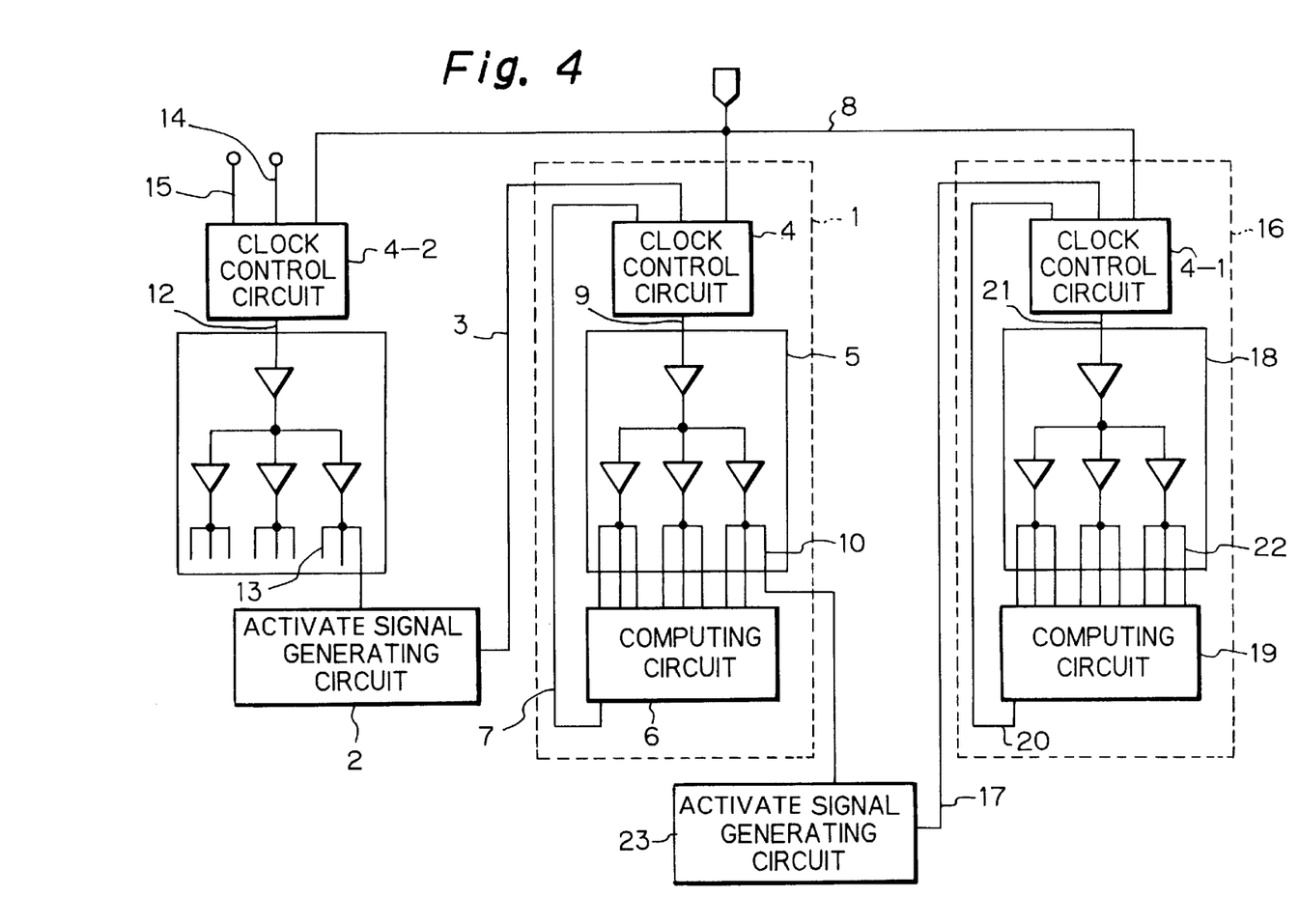
FIG. 4 is a block diagram schematically showing another alternative embodiment of the present invention.

Reference will be made to FIG. 4 for describing another alternative embodiment of the present invention in which an LSI has a plurality of element units arranged in a hierarchical structure. As shown, a clock signal control system includes a first and a second element unit 1 and 16, respectively. The activate signal generating circuit 2 remains active while the input clock signal 8 is active, and activates the clock signal 3 input to the element unit 1. Another activate signal generating circuit 23 is driven by the clock signal 10 output from the element unit 1 such that the circuit 23 remains active while the element unit 1 is active. The second clock control circuit 4-2 is locked to its active state. The clock tree 11 is also included in the system.

The activate signal generating circuit 23 delivers an activate signal 17 to the element unit 16 while receiving the clock signal 10 from the clock tree 5 of the element unit 1. The element unit 1 receives the activate signal 3 from the activate signal generating circuit 2 while the circuit 2 receives the clock signal 10 output from the clock tree 11. The clock signal 12 is fed from the clock control circuit 4-2, which is constantly active, to the clock tree 11. The element unit 16 is identical in configuration with the element unit 1 and has a clock control circuit 4-1, a clock tree 18, and a computing circuit 19. The clock signal is applied to the clock generating circuits 4, 4-1 and 4-2.

The system shown in FIG. 4 will be operated as follows. The clock signal 8 is applied to the clock control circuits 4, 4-1 and 4-2 at the same time. The clock signal 8 remains active for a longer period of time than the operation of the element unit l, the operation of the element unit 16, and the operation of the activate signal generating circuit 2. The activate signal generating circuit 2 generates the activate signal 3 when the element unit 1 should start operating. In response, the first element unit 1 is activated and causes its computing circuit 6 to start processing. At the same time, the activate signal generating circuit 23 starts operating in response to the clock signal 10 output from the element unit 1, activating the element unit 16. Specifically, the activate signal generating circuit 23 outputs the activate signal 17 for activating the element unit 16 while the element unit 1 is active. In response, the element unit 16 starts operating.

When the element units 1 and 16 end their operations, they output the stop signal 7 and a stop signal 20, respectively. The stop signals 7 and 20 are input to the clock control circuits 4 and 4-1, respectively. In response, the clock control circuits 4 and 4-1 respectively stop outputting the clock signal 9 and a clock signal 21.

Because the element unit 16 is activated only when the element unit 1 is active, it may be called an element unit subordinate to the element unit 1, i.e., a lower layer element unit.

In the illustrative embodiment, even three or more element units can be arranged in a hierarchical structure without scaling up the hierarchy of clock signals. This is because each activate signal generating circuit is driven by a clock signal output from the preceding element unit.

Figure 5:
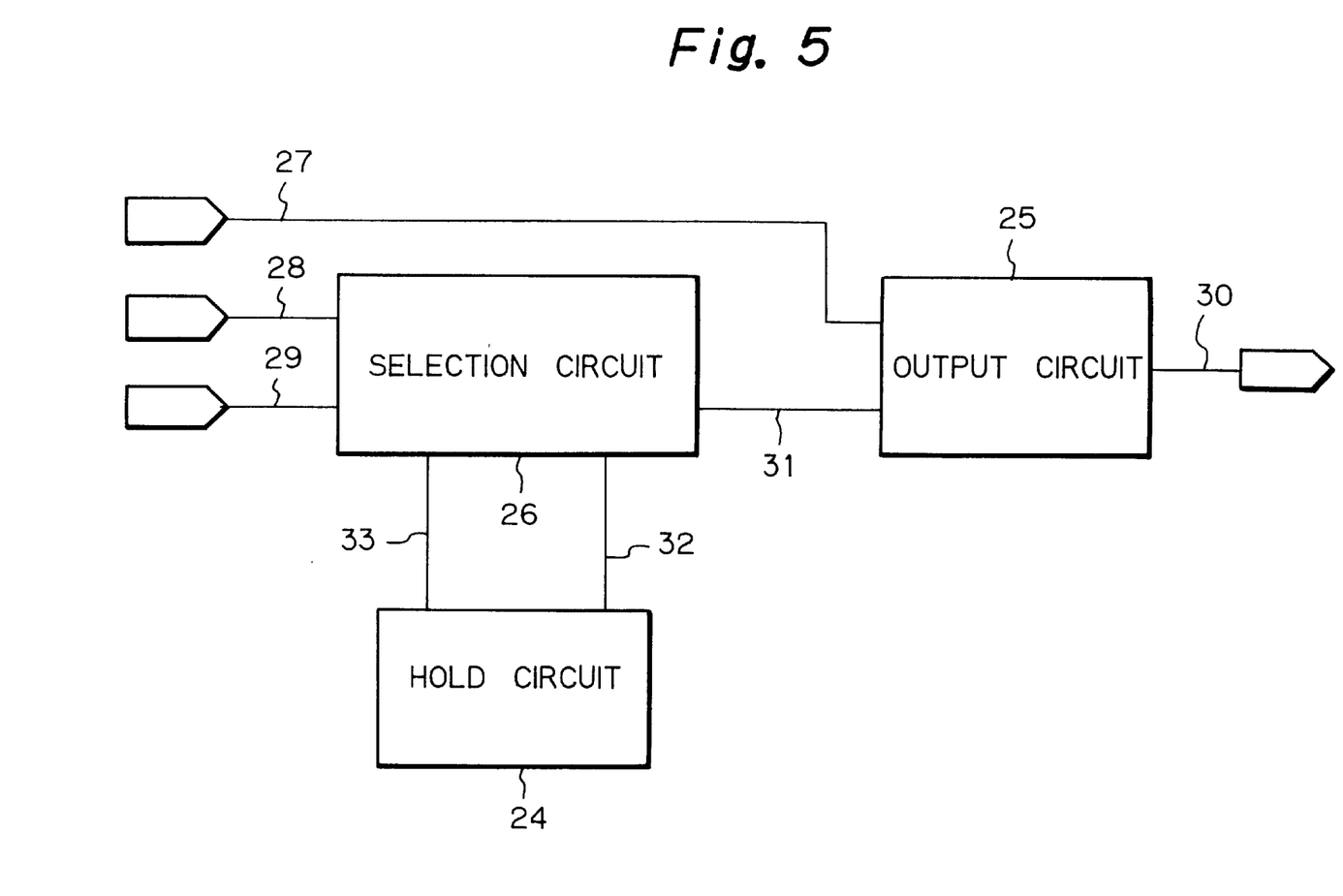
FIG. 5 is a schematic block diagram showing a specific configuration of a clock control circuit included in any one of the embodiments.

FIG. 5 shows a specific configuration of any one of the clock control circuits 4, 4-1 and 4-2 included in the above embodiments. As shown, the clock control circuit is made up of a hold circuit 24, an output circuit 25, and a selection circuit 26. The selection circuit 26 receives an activate signal 28, a stop signal 29, and a signal 33 output from the hold circuit 24, and in turn outputs a select signal 31. The output circuit 25 receives a clock signal 27 and the select signal 31 and outputs a clock signal 30 while the select signal 31 is active. When the selection circuit 26 delivers a hold signal 32 to the hold circuit 24 and if the activate signal 28 is active, the hold circuit 24 holds the activation information. When the stop signal 29 is activated, the hold circuit 24 cancels the activation information.

In operation, when the activate signal 28 is rendered active, the selection circuit 26 activates the select signal 31 and hold signal 32. In response, the output circuit 25 outputs the input clock signal 27 as the clock signal 30. When activation information is input to the hold signal 32 once, the hold circuit 24 holds the information until stop information has been input. The hold circuit 24 continuously outputs the activation information or signal 33 to the selection circuit 26. So long as the output signal 33 of the hold circuit 24 is active, the selection circuit 26 maintains the select signal 31 active. As a result, the output circuit 25 continuously outputs the clock signal 30. On the activation of the stop signal 29, the selection signal 26 delivers stop information to the output circuit 25 and hold circuit 24 in the form of signals 31 and 32. In response, the hold circuit 24 cancels the information held therein. Also, the output circuit 25 stops outputting the clock signal 30.

Figure 6:
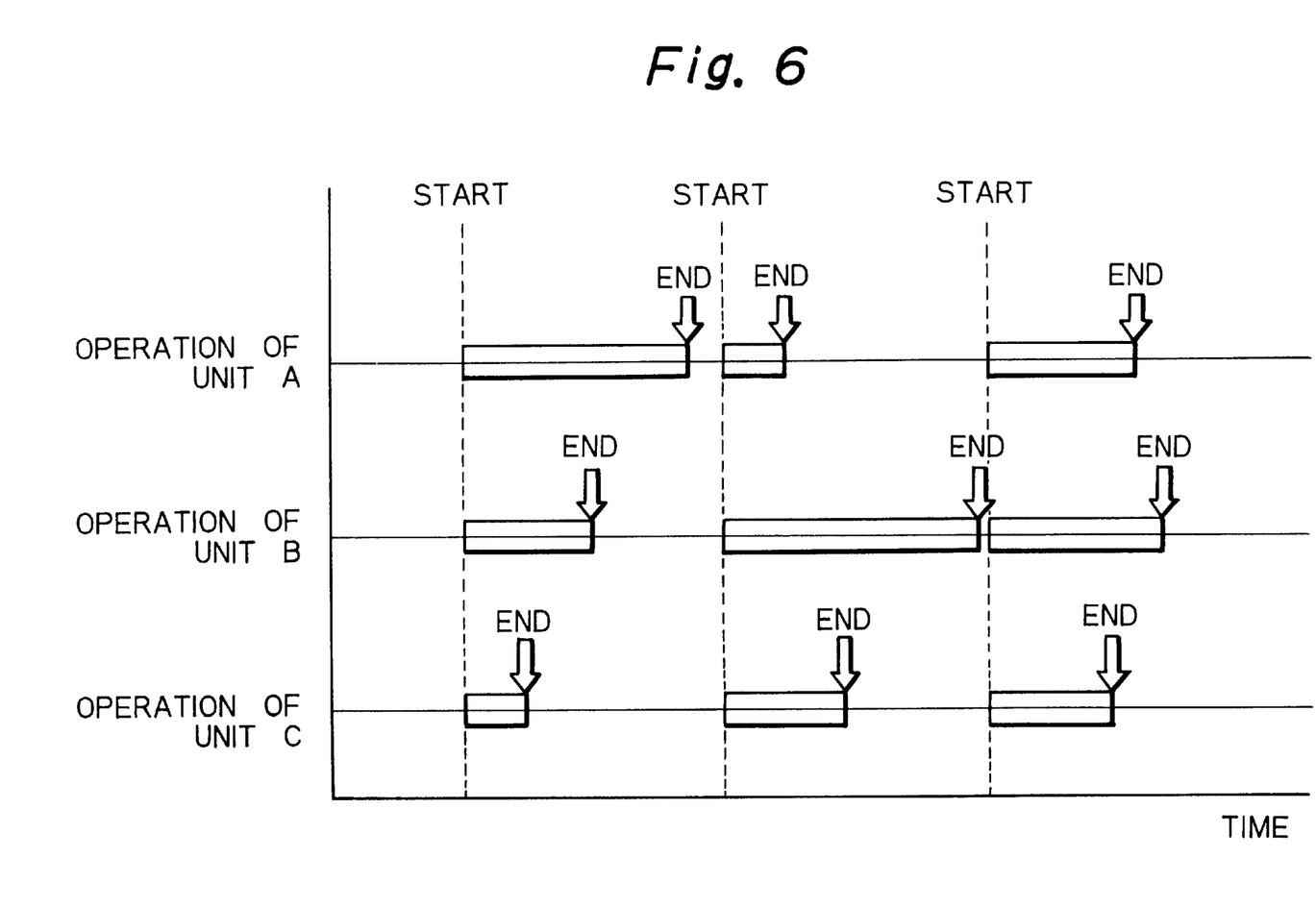
FIG. 6 is a timing chart representative of specific starts and stops of operation of a plurality of element units.

When an LSI includes a plurality of element units, each element unit starts and ends its processing, as will be described with reference to FIG. 6. As shown, assume an LSI including three element units A, B and C by way of example. This kind of LSI is sometimes constructed such that all the element units A-C start operating at the same time, but each element unit ends its processing at a particular time depending on data input thereto. Moreover, the element units of the LSI are sometimes designed individually by different designers.

Assume that the element units A-C and circuits for scheduling them are designed by different persons. Then, although it is relatively easy to generate the activate signals respectively indicative of the starts of processing of the element units A-C, it is difficult to generate the stop signals of all the element units which are dependent on the input pattern. On the other hand, while the person designing any one of the element units A-C can generate the stop signal for the element unit by use of an internal signal, it is difficult for the person to grasp the clock schedule of the entire LSI and control the clock signals of all the element units.

In light of the above, each embodiment shown and described allows the activate signal for the individual element unit to be designed at the outside of the element unit, and allows the stop signal to be designed on an element unit basis. This successfully facilitates design and enhances design quality.

Figure 7:
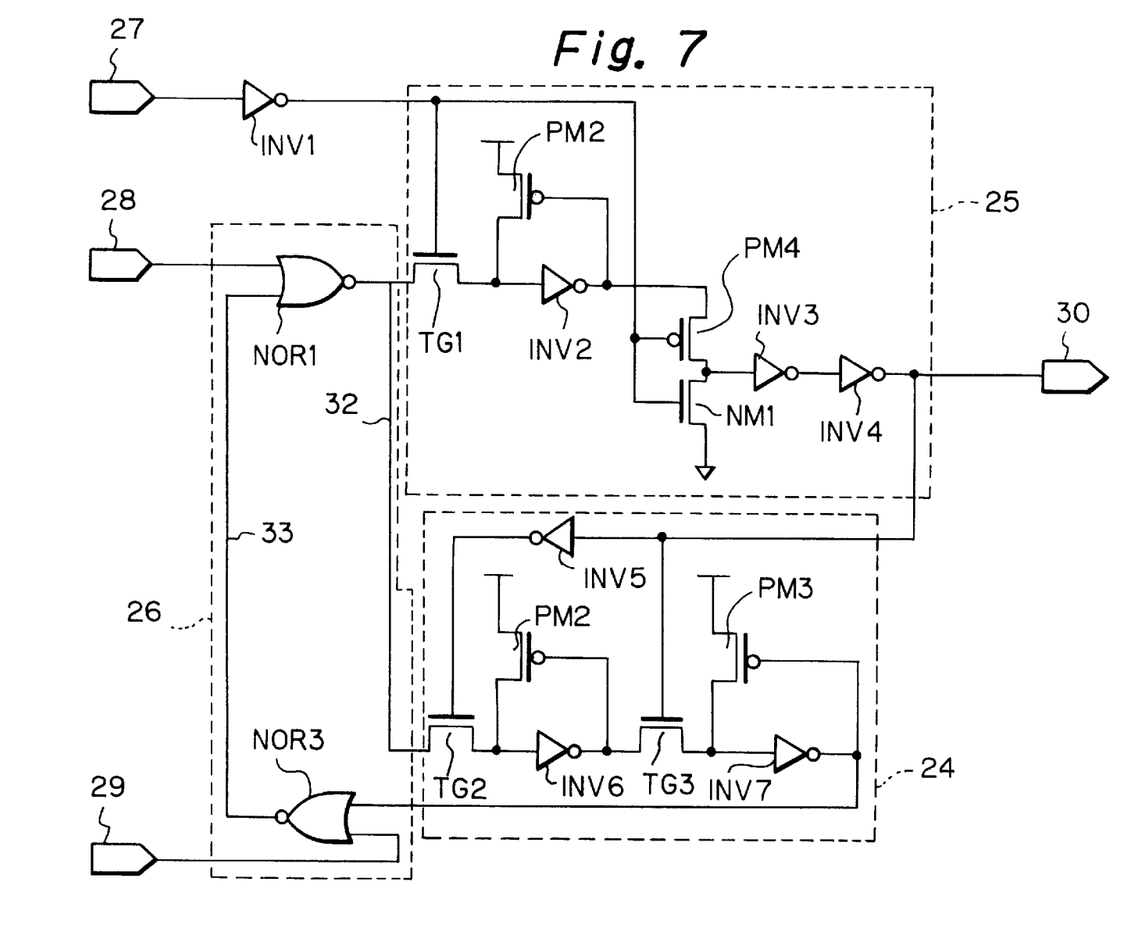
FIG. 7 is a circuit diagram showing the clock control circuit of FIG. 5.

FIG. 7 shows the clock control circuit of FIG. 5 at a gate level. In FIG. 7, the hold circuit, output circuit 25 and selection circuit 26 are indicated by phantom blocks.

Referring to FIG. 7, assume that the clock signal 27 goes high while the activate signal 28 is active. Then, the activate signal 28 having been set (NOR gate NOR1 having held its output in a low level) causes the clock signal 30 to go high via an inverter INV2, a p-channel MOS (Metal Oxide Semiconductor) transistor PM4 included in a CMOS inverter, an inverter INV3, and an inverter INV4. When the hold circuit 24 is inactive, a transfer gate (path transistor) TG2 included in the circuit 24 is nonconductive, and a transfer gate TG3 is also nonconductive. However, when the clock signal 30 goes high, the transfer gate TG3 is rendered conductive. As a result, information having been set, i.e., the low level of the output of the NOR gate NOR1 and the high level of the output of an inverter INV6 are input to and held in an inverter INV7. In response, the output signal 33 of the hold circuit 24 goes low. Consequently, when the stop signal 29 is in a low level, the output of a NOR gate 3 and that of the NOR gate NOR1 remain in a high level and a low level, respectively. In this condition, the clock signal 30 of the same phase as the clock signal 27 is continuously output even when the activate signal 28 goes low. On the other hand, when the stop signal 29 goes high (active), the output of the NOR gate NOR3 goes low and causes the output of the NOR gate NOR1 to go high. As a result, a low level is fed to the source of the p-channel MOS transistor PM4 via the inverter INV2, interrupting the clock signal 30.

In summary, it will be seen that the present invention provides a clock signal control system having various unprecedented advantages, as enumerated below.

(1) In an LSI including an element synchronous to a clock signal and whose input condition influences an output condition due to the clock signal, the element can be divided into a plurality of computing circuits. Therefore, if interrupting the clock signal fed to the individual computing circuit for a certain period of time does not influence the operation of the entire LSI, the number of steps for designing the LSI can be reduced. This solves the problem (1) discussed earlier. In addition, because a stop signal is generated within an element unit, a clock schedule can be grasped with ease, and a stop signal generating circuit can be designed and verified in a short period of time.

(2) Because the stop signal generating circuit is included in the element unit, a designer designing an element unit whose stop timing is easy to grasp designs the stop signal generating circuit also. Therefore, an increase in the number of hierarchical layers or in the number of element units can be easily coped with. This solves the problem (2) discussed earlier.

(3) Because the stop signal generating circuit is included in the element unit, it is possible to generate a stop signal by using an internal signal and therefore to reduce the area of the stop signal generating circuit. This solves the problem (3) discussed earlier. Further, this kind of configuration saves power and solves the problem (4).

(4) Because the stop signal generating circuit is included in the element unit, the number of wirings connecting different element units is reduced. This simplifies the circuit arrangement and solves the problem (5) discussed earlier.

Various modifications will become possible for those skilled in the art after receiving the teachings of the present disclosure without departing from the scope thereof.

What is claimed is:

1. A clock signal control system comprising:

at least one element unit coupled to a source of a clock signal, the element unit comprising a computing circuit for generating a stop signal for stopping the clock signal, a first clock control circuit receiving the stop signal and the clock signal for controlling a stop and activation of the clock signal, and a first clock tree coupled to the first clock control circuit and the computing circuit for distributing the clock signal; and at least one activate signal generating circuit assigned to said element unit and coupled to the first clock control circuit for generating an activate signal which causes the clock signal to be fed to the first clock tree of said element unit;

wherein said first clock control circuit causes the clock signal to be continuously fed to said first clock tree from a time when said activate signal output from said at least one activate signal generating circuit is activated to a time when said stop signal output from said computer circuit is activated, and wherein a clock signal output from said first clock tree is fed to at least one of said computing circuit and an activate signal generating circuit assigned to another element unit subordinate to said at least one element unit.

2. A system as claimed in claim 1, further comprising:

a second clock tree; and a second clock control circuit for constantly feeding a clock signal to said second clock tree while receiving a constantly active activate signal;

wherein said second clock tree constantly feeds a clock signal to said activate signal generating circuit, wherein said system is designed such that said first and second clock tree have a same delay time, and wherein the clock signal for driving said activate signal generating circuit and the clock signal for driving said computing circuit have a same phase.

3. A system as claimed in claim 2, wherein there are a plurality of element units arranged in layers, including a lower layer element unit and an upper layer element unit and wherein the lower layer element unit is activated for a period of time dependent on an active state of said computing circuit and the upper layer element unit remains active for a longer period of time than said lower layer element unit, including said period of time of said lower layer element unit, the upper and lower layer element units being arranged in a hierarchical structure, wherein said activate signal generating circuit assigned to said upper layer element unit is driven by said second clock tree while an activate signal generating circuit assigned to said lower layer element unit is driven by a clock signal output from said upper layer element unit, wherein said first and second clock control circuits are driven by the constantly active clock signal, and wherein all activate signal generating circuits and all computing circuits each included in an individual element unit, are coincident in a phase of a clock signal while all computing circuits each included in an individual element unit are provided with a hierarchial structure based on a clock signal.

4. In a Large Scale Integration device (LSI) including an element synchronous to a clock signal and whose input condition influences an output condition due to said clock signal, a clock signal control system allowing said element to be divided into a plurality of computing circuits and preventing an individual computing circuit from affecting an operation of said LSI device even when said clock signal is interrupted for a certain period of time, said system comprising:

at least one element unit; and at least one activate signal generating circuit assigned to said element unit;

said at least one activate signal generating circuit generating an activate signal for causing a clock signal to be processed by said element unit in accordance with a processing schedule of said element unit;

said element unit comprising:

a clock control circuit receiving the clock signal;

a clock tree coupled to the clock control circuit for receiving a clock signal from said clock control circuit and distributing said clock signal; and a computing circuit coupled to the clock tree for receiving a clock signal output from said clock tree as a drive clock and for producing a stop signal output;

wherein said clock control circuit continuously feeds said clock signal to said clock tree from a time when said activate signal output from said activate signal generating circuit is activated to a time when the stop signal output from said computing circuit is activated, wherein said computing circuit generates, in synchronism with said clock signal, said stop signal output for interrupting computation and application of the clock signal to said computing circuit, and wherein said activate signal provided to said clock control circuit is fed from outside of said element unit while application of the clock signal to said clock tree is stopped by said stop signal output from said computing circuit.

5. A system as claimed in claim 4, wherein said clock control circuit comprises a selection circuit, an output circuit, and a hold circuit, wherein said selection circuit receives said activate signal, said stop signal, and an output signal of said hold circuit and activates a selection signal and a hold signal when said activate signal or said output signal of said hold circuit is active, wherein said output circuit receives an input clock signal and said selection signal and outputs the input clock signal as an output clock signal only when said selection signal is active, wherein said hold circuit receives said output signal of said selection circuit as a hold signal and holds said output signal when said hold signal is active, and wherein said output circuit continuously outputs said output clock signal from a time when said activate signal is activated to a time when said stop signal is activated.

* * * * *